Patented Apr. 4, 1950

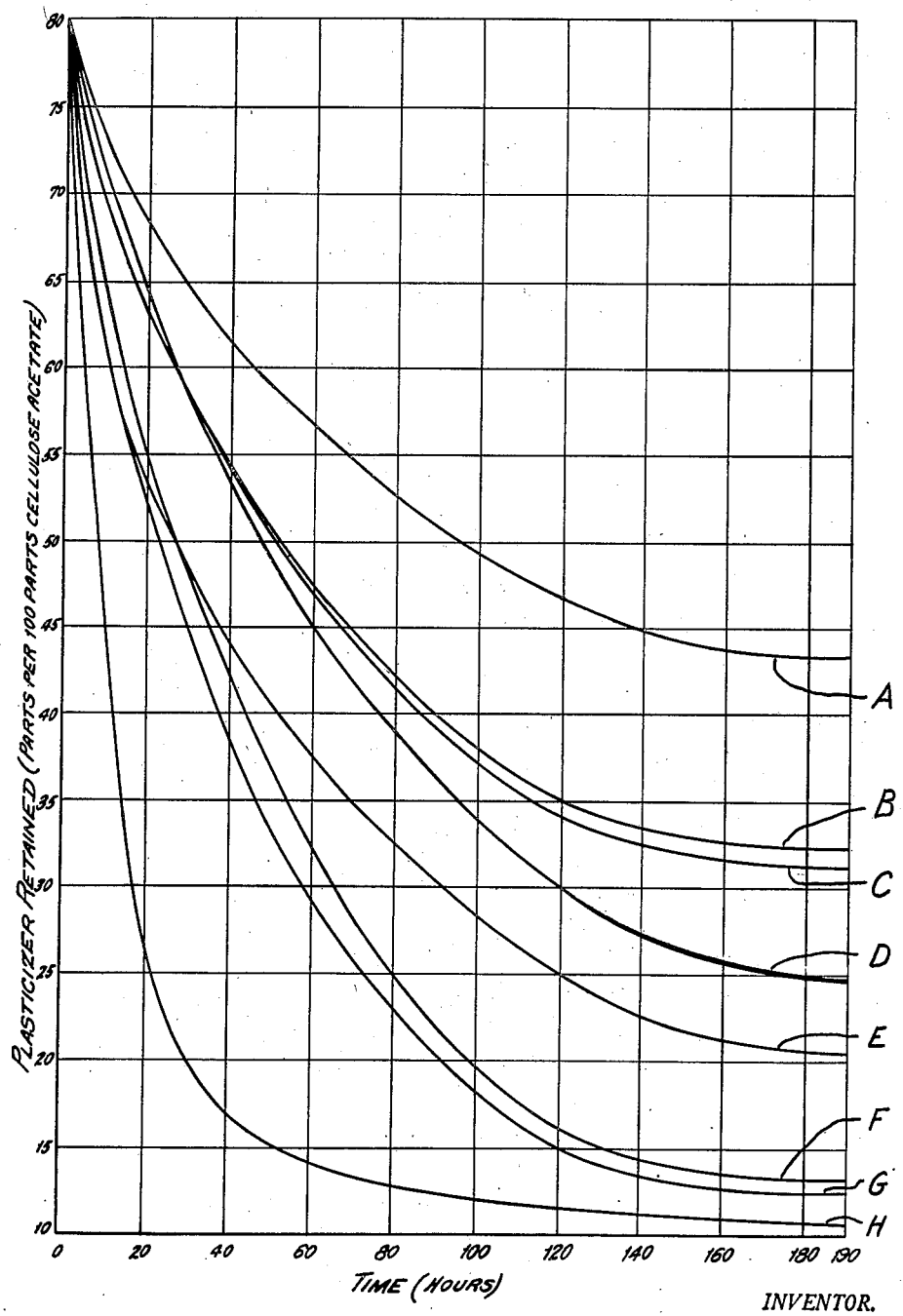

2,502,962

UNITED STATES PATENT OFFICE 2,502,962

CELLULOSE COMPOUND PLASTICIZED WITH AN ALPHA-ALKENYL SUCCINIMIDE

Mearl Alton Kise, Petersburg, Va., assignor to Allied Chemical & Dye Corporation, a corporation of New York Application December 24, 1946, Serial No. 718,210

6 Claims. (Cl. 106—176)

This invention relates to plastic compositions and to plasticizers therefor.

In the manufacture of plastic compositions from cellulose esters and ethers, phenol-aldehyde casting resins, vinyl-chloride-vinyl-acetate copolymers, acrylonitrile-butadiene copolymers, zein, 2-chlorobutadiene polymers, chlorinated rubber and the like, it is frequently necessary to modify the physical properties of the resinous or rubber-like material by the addition of a plasticizing or softening agent. Various types of organic compounds have been employed for this purpose in the past. Among such materials are tricresyl phosphate, phthalic acid esters, such as diethyl phthalate and dibutyl phthalate, methyl phthalyl ethyl glycolate, dimethoxy ethyl phthalate, and other organic esters and ethers. Some of the plasticizers are more compatible than others with particular groups of resin compositions; that is, they have less tendency to precipitate or crystallize out from mixtures to produce milky or opaque effects. On the other hand some of the most compatible of the plasticizers, because of instability, volatility or solubility, lose their effectiveness in maintaining the desired plastic properties in the products. Thus the products may be subject to embrittlement with age, heat or contact with oil.

The present invention has for an object the provision of plastic compositions comprising a new class of plasticizers. It has as a further object the provision of compositions of plastic and plasticizer which are relatively age-resistant and free from sweating, hazing, etc. A still further object of the invention is the provision of plasticizers which impart flexibility and toughness and which are not eliminated from plastic compositions as readily as commonly employed plasticizers and therefore provide more durable compositions. Still further objects of the invention will be apparent from the following description and specific examples.

In accordance with my invention plastic compositions of improved properties are prepared by incorporating with a plastic of one of the specified types, as a plasticizer therefor, at least one unsubstituted α-alkenyl succinimide of the general formula:

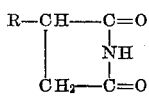

wherein R represents an aliphatic substituent comprising from 4 to 16 carbon atoms inclusive, in the form of a straight or branched chain.

I have found that the imides of the class described not only are effective plasticizers for plastics of the group previously specified, but possess excellent compatibility with such plastics, for instance, cellulose nitrate, cellulose acetate, cellulose acetate butyrate, ethyl cellulose, "Vinylite VYHH," zein, chlorinated rubber ("Tornesite") and rubber GR-A, and have excellent resistance to loss by aging.

The succinimide plasticizers of the invention may be obtained by reaction of corresponding acids with ammonia to form ammonium salts, followed by thermal dehydration and deammoniation of the ammonium salts, or they may be obtained from the corresponding anhydrides by reaction with ammonia at temperatures of about 175° to 250° C. Alkenyl succinic anhydrides are obtainable by condensation of olefins with maleic anhydride.

The α-alkenyl succinimides may tend to darken somewhat with age. When conditions are such as to provoke this effect, the alkenyl derivatives may be employed in conjunction with small amounts of antioxidants, for instance, ½% of p-benzylaminophenol or α-naphthylamine, which have been found to overcome the discoloration and otherwise improve the aging qualities of the alkenyl succinimide plasticizers.

The unsubstituted α-alkenyl succinimides of the invention are liquids boiling between about 150° and about 280° C. at 10 mm. of mercury, absolute pressure. They are substantially insoluble in cold water and only slightly soluble in hot water, and at ordinary room temperatures are slightly denser than water. They are readily miscible with organic solvents, such as alcohols, ketones and hydrocarbons. Hydrolysis of these imides occurs at an extremely slow rate even in hot water. Thus with 9 parts water hydrolysis occurs to the extent of only 1% to 3% in 100 hours at 100° C. In this respect they are substantially superior to the commonly employed phosphate and phthalate plasticizers.

The plasticizers of the invention may be used alone or in admixture with other plasticizers. They are particularly beneficial in conferring upon plasticizers of low compatibility a higher degree of compatibility. Thus, used alone, dibutyl phthalate, triphenyl phosphate, or tricresyl phosphate is compatible with a cellulose acetate to the extent of less than 30 parts per hundred. When mixed with 60% to 100% of its weight of an alkenyl succinimide of the invention, the relatively incompatible plasticizer becomes compatible to the extent of 40 to 50 parts (a total of 80 parts of the two plasticizers)

per hundred of cellulose acetate. This compatibility imparting property varies with the length of the alkenyl group and with the identity of the relatively incompatible plasticizer. Thus for tricresyl phosphate the succinimides with 10 to 12 carbon alkenyl groups were found to be somewhat superior to those with 6 to 8 and 8 to 10 carbon alkenyl groups, whereas with dibutyl phthalate and triphenyl phosphate the order was reversed.

In the illustrative examples which follow, the alkenyl succinimides employed were obtained from the corresponding alkenyl succinic anhydrides by the procedure described below. In this description and in the examples proportions are expressed in terms of weight unless otherwise indicated.

About 44 parts of the anhydride was placed in an iron or glass reactor and ammonia was introduced at the rate of about 4 parts per hour while the temperature was maintained at about 225°–230° C. until 1.5 mols of ammonia had been introduced per mol of anhydride. The product comprised approximately 94% imides which were removed from the remaining 6% non-volatile residue by distillation.

The mixed alkenyl succinic anhydrides used were obtained from olefinic distillates by the process described in Example 2 of United States Patent 2,411,215 of Mearl A. Kise and Robert F. Engle, entitled "Production of substituted succinic anhydrides." The olefinic distillate fractions employed were obtained by distillation of cracked petroleum fractions comprising principally aliphatic mono-olefins containing from 3 to 16 carbon atoms per molecule and small amounts of paraffins, diolefins, and dissolved gases such as methane and water. After removal of water, as described in Example 1 of the aforesaid application, the petroleum fraction was fractionally distilled in a still equipped with a rectifying column and the following fractions obtained: a 6–8 carbon olefin fraction at a distillation temperature of 75°–125° C.; and 8–10 carbon olefin fraction at a distillation temperature of 125°–175° C.; a 10–12 carbon olefin fraction at a temperature of 175°–225° C., and a 12–16 carbon olefin fraction at a temperature 225°–275° C. These fractions were employed in making the alkenyl succinic anhydrides in accordance with the procedure of Example 2 of that application for use in making the succinimides having alpha alkenyl substituents of corresponding carbon content.

EXAMPLE 1

Comparative tests were made with three different plasticizer compositions within the purview of the invention and five previously known plasticizers. In each case a plasticizer was added to a 13% solution of cellulose acetate in acetone in a ratio of 80 parts plasticizer per 100 parts cellulose acetate. The cellulose acetate was a low-medium viscosity high acetyl content ester. The resulting solution was poured onto a horizontal tin-plated panel and dried at about 25° C. After the film was dry, it was placed in a constant temperature-humidity chamber (25° C. and 50% relative humidity) for 18 hours. Each sample was weighed, then placed in an oven at 100° C. and (after cooling to room temperature) was reweighed at 24-, 48-, 72-, 140- and 190-hour intervals. For purposes of comparison the loss of weight was considered to represent loss of plasticizer.

In the accompanying drawing, Fig. 1, the data of this group of tests are plotted as curves representing the proportion of the plasticizer retained for any age in hours up to the maximum.

The plasticizers employed were as follows:

Curve A: An $\alpha$-alkenyl succinimide mixture wherein the alkenyl groups contained between 10 and 12 carbon atoms;

Curve B: An $\alpha$-alkenyl succinimide mixture wherein the alkenyl groups contained between 8 and 10 carbon atoms;

Curve C: An $\alpha$-alkenyl succinimide mixture wherein the alkenyl groups contained between 6 and 8 carbon atoms;

Curve D: Triphenyl phosphate;

Curve E: A mixture of triphenyl phosphate and diethyl phthalate in a weight ratio of 1:1;

Curve F: Dimethoxyethyl phthalate;

Curve G: Methyl phthalyl ethyl glycolate; and

Curve H: Diethyl phthalate.

It is apparent from a glance at the curves that all three of the alkenyl succinimide compositions were superior to all other plasticizers employed and that the results obtained with the alkenyl succinimides of 10–12 carbon atom alkenyl radicals were especially noteworthy even in comparison with the other succinimide derivatives. The slopes of all of the curves are very nearly horizontal at the 190-hour point and indicate that even at the temperature of the tests further losses would be small over an extended period of time. The concentrations of the plasticizers (ratios of plasticizers to cellulose acetate) at this point are approximately as follows:

|   | Percent |   | Percent |
|---|---------|---|---------|
| A | 43 | E | 20 |
| B | 32 | F | 16 |
| C | 31 | G | 15 |
| D | 25 | H | 10 |

It is evident from this tabulation that relatively much larger proportions of the plasticizers of the invention can be incorporated without danger of loss.

Comparable results are obtainable with high viscosity low acetyl cellulose esters, low viscosity high acetyl esters and high medium viscosity low acetyl esters, also with cellulose nitrate, ethyl cellulose and cellulose acetate butyrate (16% butyryl).

EXAMPLE 2

Acrylonitrile - butadiene copolymer compositions (synthetic rubbers) were prepared with dibutyl phthalate, dibenzyl sebacate and $\alpha$-alkenyl ($C_{10-12}$) succinimides, respectively, as plasticizers. For the three specimens the compounding and curing were done in identical manner. The following compounding materials were employed in the proportions indicated:

|  | A | B | C |
|---|---|---|---|
| Hycar OR-15 (GR-A) | 100.0 | 100.0 | 100.0 |
| Zinc Oxide | 5.0 | 5.0 | 5.0 |
| Channel Black (EPC) | 50.0 | 50.0 | 50.0 |
| Stearic Acid | 0.5 | 0.5 | 0.5 |
| Sulfur | 1.5 | 1.5 | 1.5 |
| Altax | 1.5 | 1.5 | 1.5 |
| Dibutyl phthalate | 30.0 | | |
| Dibenzyl Sebacate | | 30.0 | |
| Alkenyl Succinimides | | | 30.0 |

The following data were obtained upon testing the resulting compositions for stress at 300% and 500% elongation, breaking stress or tensile strength, elongation at breaking stress, and hardness:

TABLE 1
[Unaged.]

| Cure at 153° C., minutes | Stress, Pounds per sq. in. | | Tensile, Pounds per sq. in. | Elongation, per cent | Hardness, Shore A |
|---|---|---|---|---|---|
| | 300% | 500% | | | |
| DIBUTYL PHTHALATE | | | | | |
| 30 | 1,050 | 2,450 | 2,950 | 560 | 56 |
| 45 | 1,300 | 2,800 | 3,050 | 520 | 58 |
| 60 | 1,400 | 3,150 | 3,250 | 510 | 62 |
| 75 | 1,450 | | 3,200 | 490 | 62 |
| 90 | 1,550 | | 3,350 | 480 | 62 |
| DIBENZYL SEBACATE | | | | | |
| 30 | 1,050 | 2,500 | 2,800 | 550 | 60 |
| 45 | 1,250 | 2,800 | 3,200 | 540 | 62 |
| 60 | 1,400 | 3,100 | 3,250 | 510 | 62 |
| 75 | 1,450 | 3,200 | 3,350 | 510 | 62 |
| 90 | 1,600 | | 3,100 | 470 | 62 |
| ALKENYL SUCCINIMIDES | | | | | |
| 30 | 650 | 1,650 | 2,800 | 720 | 58 |
| 45 | 800 | 1,900 | 3,100 | 680 | 60 |
| 60 | 900 | 2,150 | 3,300 | 660 | 60 |
| 75 | 1,000 | 2,350 | 3,500 | 650 | 61 |
| 90 | 1,000 | 2,450 | 3,400 | 630 | 61 |

The superior elongation of the unaged products of the invention is apparent from the data in the preceding table. However, it is still more noteworthy after aging, as shown by Table 2.

TABLE 2
After aging four days at 100° C. in the air:

| Cure at 153° C., Minutes | Stress, Pounds per sq. in. | | Tensile, Pounds per sq. in. | Elongation, per cent | Hardness, Shore A |
|---|---|---|---|---|---|
| | 300% | 500% | | | |
| DIBUTYL PHTHALATE | | | | | |
| 30 | | | 3,000 | 270 | 75 |
| 45 | | | 3,200 | 260 | 75 |
| 60 | | | 3,200 | 280 | 76 |
| 75 | | | 3,300 | 280 | 76 |
| 90 | | | 3,400 | 290 | 76 |
| DIBENZYL SEBACATE | | | | | |
| 30 | | | 2,800 | 280 | 70 |
| 45 | | | 3,000 | 290 | 70 |
| 60 | 3,000 | | 3,000 | 300 | 70 |
| 75 | 2,900 | | 3,050 | 310 | 70 |
| 90 | 2,800 | | 3,000 | 310 | 70 |
| ALKENYL SUCCINIMIDES | | | | | |
| 30 | 1,800 | | 3,400 | 460 | 70 |
| 45 | 1,900 | | 3,500 | 460 | 70 |
| 60 | 1,900 | | 3,700 | 490 | 70 |
| 75 | 1,900 | | 3,600 | 490 | 70 |
| 90 | 1,900 | 3,800 | 3,800 | 500 | 70 |

The weight loss of the vulcanized product while aging four days at 100° C. was as follows:

TABLE 3

| Softener | Cure in Minutes at 153° C. | Per cent Loss of Weight |
|---|---|---|
| Dibutyl Phthalate | 45 | 12.8 |
| Do | 75 | 13.4 |
| Dibenzyl Sebacate | 45 | 0.6 |
| Do | 75 | 0.6 |
| Alkenyl Succinimides | 45 | 5.2 |
| Do | 75 | 4.3 |

Compositions cured at 153° C. for 75 minutes were tested to determine weight loss upon oil immersion at room temperature for 24- and 48-hour periods. A commercial paraffinic hydrocarbon oil and a mixture of 40% aromatic and 60% paraffinic hydrocarbon oils were used. The results are given in Tables 4 and 5, respectively.

TABLE 4
*Paraffinic hydrocarbon oil*

| Softener | Weight Loss— | |
|---|---|---|
| | after 24 hours | after 48 hours |
| Dibutyl Phthalate | 1.25 | 2.20 |
| Dibenzyl Sebacate | 1.49 | 2.55 |
| Alkenyl Succinimides | 0.51 | 1.05 |

TABLE 5
*Aromatic and paraffinic hydrocarbon oil*

| Softener | Weight Loss— | |
|---|---|---|
| | after 24 hours | after 48 hours |
| Dibutyl Phthalate | 2.68 | 5.10 |
| Dibenzyl Sebacate | 2.84 | 5.80 |
| Alkenyl Succinimides | 0.05 | 0.15 |

EXAMPLE 3

This example illustrates the application of the plasticizers to Neoprene GN (a 2-chlorobutadiene polymer). The following compounding ingredients were employed in the proportions indicated:

| | |
|---|---|
| Neoprene GN (GR–M) | 100.0 |
| Stearic acid | 0.5 |
| Neozone A (phenyl alpha naphthylamine) | 2.0 |
| Calcined magnesia | 4.0 |
| Furnace black | 100.0 |
| Heliozone (petroleum wax) | 1.5 |
| Alkenyl ($C_{10-12}$) succinimides | 10.0 |
| Zinc oxide | 5.0 |

The stock was mixed on a cool mill. Compounding ingredients were added in the order tabulated.

The product was cured at 142° C. and tested for tensile strength, elongation, and hardness. The results are given in Table 6.

TABLE 6

| Minutes | Tensile, Pounds per sq. in. | Percent Elongation | Hardness, Shore A |
|---|---|---|---|
| 15 | 1,700 | 280 | 80 |
| 30 | 1,900 | 220 | 82 |
| 45 | 2,000 | 200 | 82 |
| 60 | 2,050 | 200 | 82 |

EXAMPLE 4

The compatibility of a series of α-alkenyl succinimides was tested by mixing 80 parts of the imide with 100 parts of high viscosity, low acetyl cellulose acetate, heating to 230° C. to effect solution, and cooling to room temperature. The following imides were tested in this manner and gave clear solid plastics:

α-Butene-1 succinimide
α-Butene-2 succinimide
α-Isobutene succinimide
α-$C_{8-10}$ alkenyl succinimide
α-$C_{10-12}$ alkenyl succinimide
α-$C_{12-16}$ alkenyl succinimide The last three materials listed were mixtures of succinimides containing alkenyl substituents with the designated numbers of carbon atoms and all were prepared in the manner previously described.

EXAMPLE 5

The compatibility of a series of α-alkenyl succinimides was tested by mixing 80 parts of the imide with 100 parts of cellulose acetate (Hercules FM-6), dissolving the mixture in acetone, spreading a film of the solution on a plate, and drying in a desiccator.

The following imides were tested in this manner and gave clear films:

α-Butene-2 succinimide
        α-Isobutene succinimide
        α-$C_{8-10}$ alkenyl succinimide
        α-$C_{10-12}$ alkenyl succinimide
        α-$C_{12-16}$ alkenyl succinimide

EXAMPLE 6

To 100 parts of a phenol-formaldehyde resin casting syrup containing a 2.5 mol ratio of formaldehyde to phenol 15 parts of α-$C_{8-10}$ alkenyl succinimide was added and the mixture was cured for 96 hours at 80° C. A clear cast resin was obtained.

Similar results were secured substituting 8.8 parts of the same succinimide in place of the 15 parts.

I claim:

1. A plastic composition comprising a member of the group consisting of cellulose esters and ethers and, as a plasticizer therefor, at least one unsubstituted α-alkenyl succinimide containing not more than 4 nor more than 16 carbon atoms in the alkenyl group.

2. A plastic composition comprising a member of the group consisting of cellulose esters and ethers, an anti-oxidant and, as a plasticizer, at least one unsubstituted α-alkenyl succinimide containing not more than 4 nor more than 16 carbon atoms in the alkenyl group.

3. A plastic composition comprising cellulose acetate and, as a plasticizer therefor, at least one unsubstituted α-alkenyl succinimide containing not less than 6 nor more than 12 carbon atoms in the alkenyl group.

4. A plastic composition comprising cellulose acetate, an antioxidant and, as a plasticizer, at least one unsubstituted α-alkenyl succinimide containing not less than 6 nor more than 12 carbon atoms in the alkenyl group.

5. A plastic composition comprising cellulose acetate and, as a plasticizer therefor, at least one unsubstituted α-alkenyl succinimide containing not less than 10 nor more than 12 carbon atoms in the alkenyl group.

6. A plastic composition comprising cellulose acetate, an antioxidant and, as a plasticizer, at least one unsubstituted α-alkenyl succinimide containing not less than 10 nor more than 12 carbon atoms in the alkenyl group.

MEARL ALTON KISE.

REFERENCES CITED

The following references are of record in the file of this patent:

UNITED STATES PATENTS

| Number | Name | Date |
|---|---|---|
| 1,844,714 | Carroll et al. | Feb. 9, 1932 |
| 2,169,330 | Seymour | Aug. 15, 1939 |